United States Patent Office 3,274,358
Patented Sept. 20, 1966

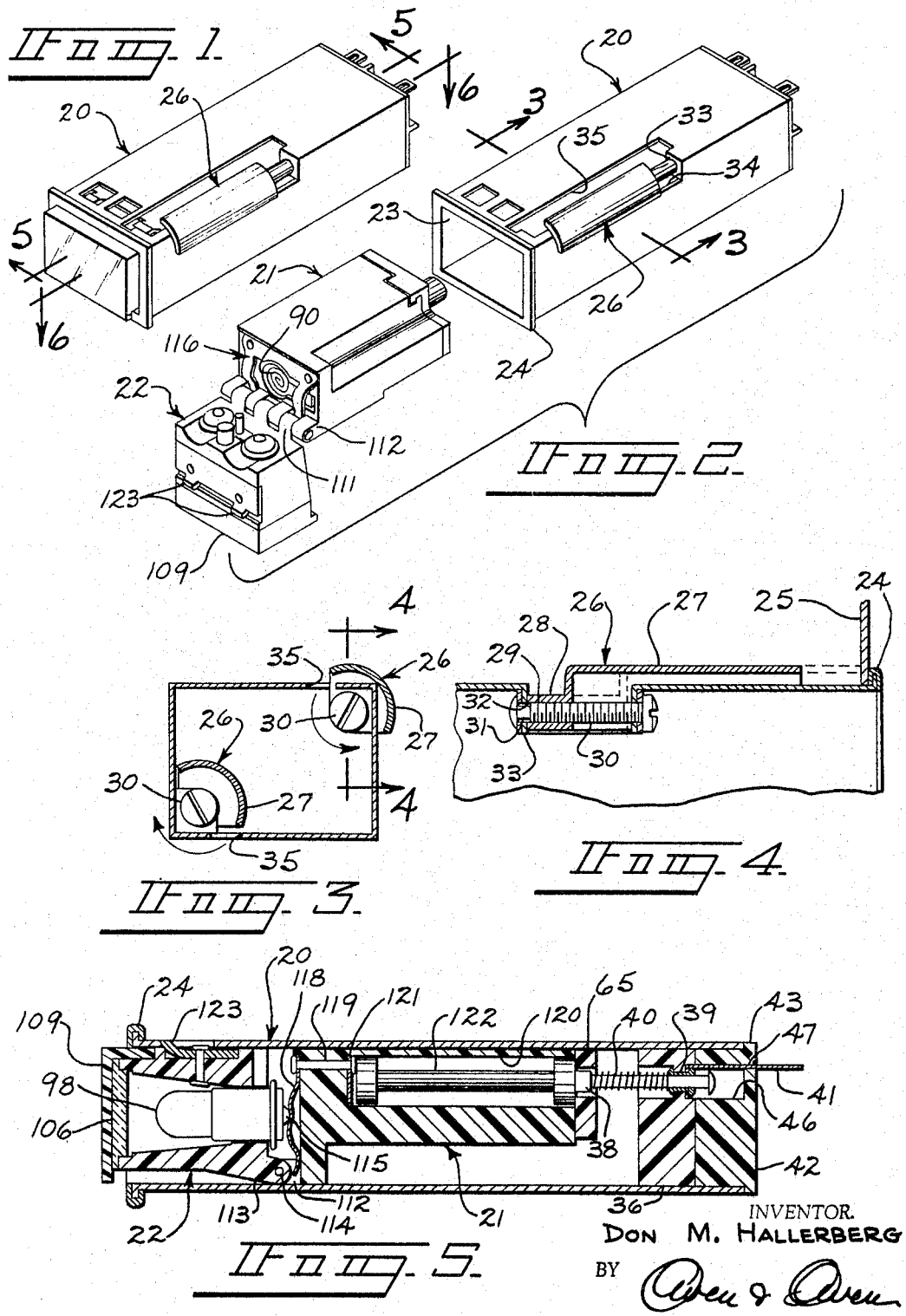

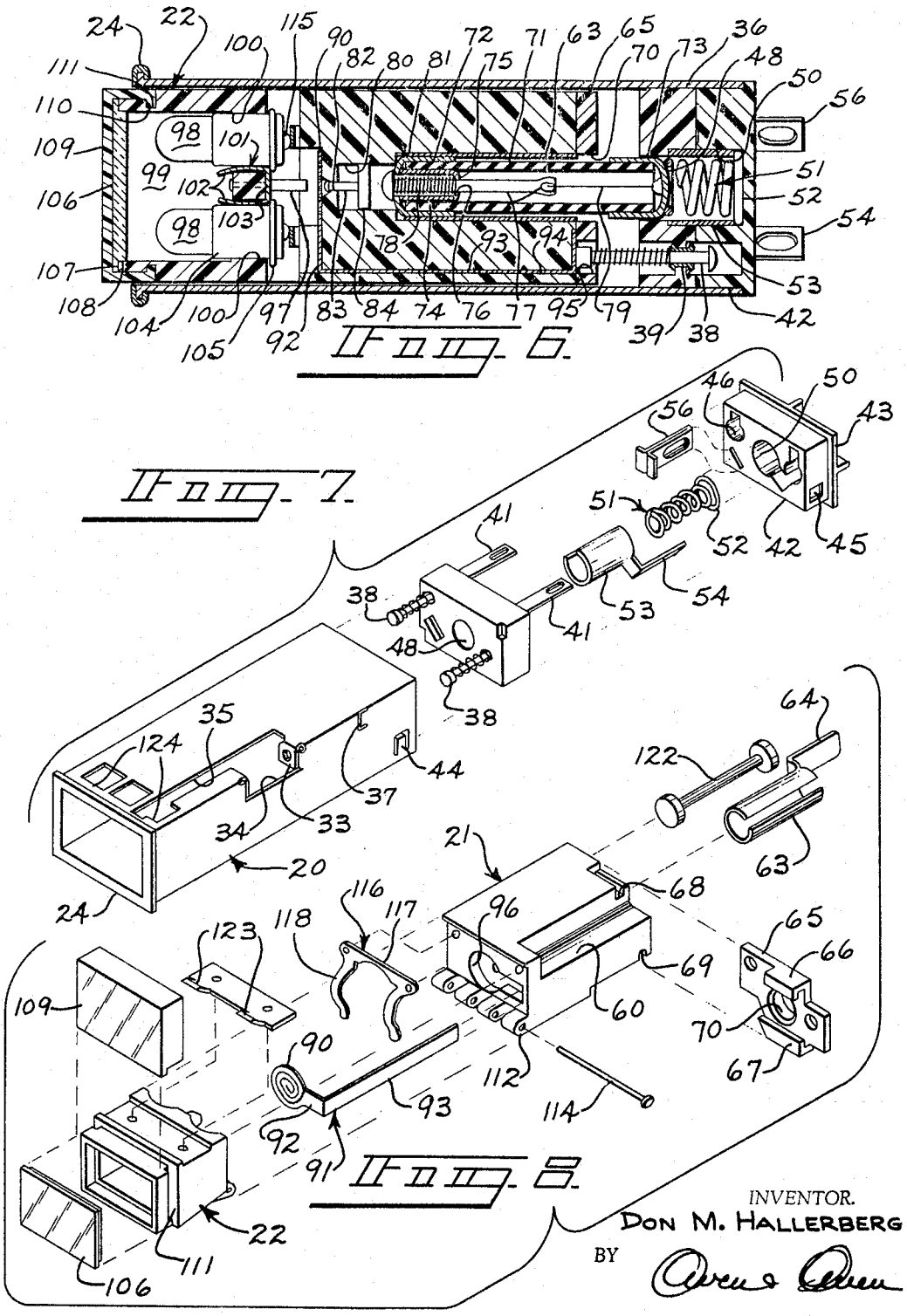

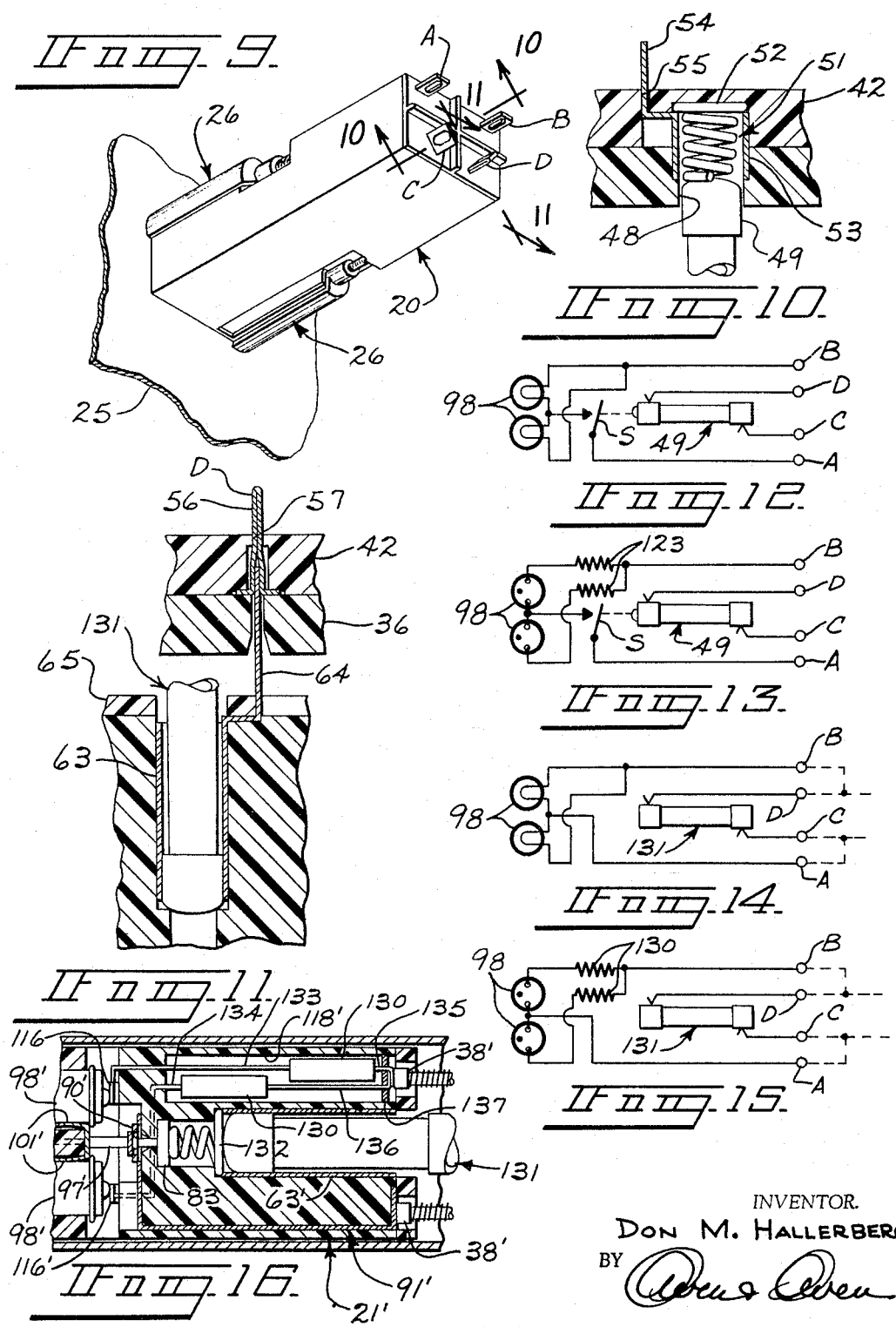

3,274,358
INDICATOR LIGHT HAVING A PIVOTALLY-
CONNECTED LIGHT HOUSING BLOCK AND
A LENS COVER SECTION SLIDABLY
MOUNTED THEREON
Don M. Hallerberg, San Pedro, Calif., assignor to Master
Specialties Company, Gardena, Calif., a corporation of
California
Filed July 29, 1963, Ser. No. 298,090
8 Claims. (Cl. 200—121)

The present invention relates to panel mounted instruments, and to lights for indicating the condition of electrical components and/or circuits.

One object of the present invention is the provision of new and improved means for fastening instruments to instrument panels.

Another object of the invention is the provision of a new and improved electrical switch whose movable elements have very little inertia and which is not actuated even by extreme vibration.

In addition to accomplishing the foregoing objects, the invention provides a new and improved instrument light having a housing into which a pair of blocks are adapted to be inserted in tandem relationship when said blocks are aligned; the outer block having a light bulb whose base projects beyond the rear surface of the block, and the inner block having an electrical terminal for making contact with the bulb; the two blocks being hinged together to permit ready access to the rear of the bulb and to assure accurate engagement of the terminal by the base of the light bulb when the blocks are aligned for insertion into the housing.

The invention resides in certain constructions and combinations, and arrangements of parts, and further objects and advantages will become apparent to those skilled in the art from the following description of the preferred embodiments described with reference to the accompanying drawings forming a part of this specification, and in which:

FIG. 1 is an isometric view of an instrument for mounting in a panel, which instrument contains a fuse for an electrical circuit as well as an indicating light which becomes lighted when the fuse is blown;

FIG. 2 is an exploded view of the instrument of FIG. 1 showing the internal assembly of the instrument positioned endwise of the housing of the instrument;

FIG. 3 is a sectional view taken approximately on the line 3—3 of FIG. 2;

FIG. 4 is a fragmentary sectional view taken approximately on the line 4—4 of FIG. 3;

FIG. 5 is a longitudinal sectional view taken approximately on the line 5—5 of FIG. 1;

FIG. 6 is a transverse sectional view taken approximately on the line 6—6 of FIG. 1;

FIG. 7 is an exploded view of the housing of the instrument together with the parts which go to make up the rear wall of the housing;

FIG. 8 is an exploded view of the parts which comprise the internal assembly that is received in the housing formed by the parts of FIG. 7;

FIG. 9 is an isometric view of the bottom rear of an instrument mounted on a panel board;

FIG. 10 is a fragmentary sectional view taken approximately on the line 10—10 of FIG. 9;

FIG. 11 is a fragmentary sectional view taken approximately on the line 11—11 of FIG. 9;

FIG. 12 is a circuit diagram of the electrical circuitry involved in the embodiment of instrument shown in FIGS. 1–11;

FIG. 13 is a circuit diagram similar to FIG. 12 showing the electrical circuitry of a second embodiment of the invention;

FIG. 14 is a circuit diagram similar to FIG. 12 showing the electrical circuitry of a third embodiment of the invention;

FIG. 15 is a circuit diagram similar to FIG. 12 showing the electrical circuitry of a fourth embodiment of the invention; and FIG. 16 is a fragmentary sectional view of the fourth embodiment of the invention whose electrical circuitry is shown in FIG. 15.

While the invention may be otherwise embodied, it is herein shown and described as included in an instrument which contains a fuse and an indicating light which becomes lighted when the fuse is blown. The instrument is adapted for panel mounting and is so arranged that both the fuse and the indicating light can be removed from the front of the panel and readily replaced. The instrument shown in FIGS. 1–12 comprises: a housing 20 which is installed from the front of a panel; a fuse block 21 which is inserted into the housing from the front of the panel; and a light block 22 which is inserted into the housing in front of the fuse block.

The housing 20 is made from sheet metal to provide an internal chamber 23 of rectangular cross section. The front of the housing 20 has a radially outwardly turned flange 24 which is adapted to abut the front face of an instrument panel 25 (see FIG. 4) while the remainder of the housing projects through an opening in the panel slightly larger than the main portion of the housing.

The housing 20 is held in place by a pair of abutment members 26 which engage the back of the panel and confine the panel between themselves and the front flange 24. The abutment members each have a forwardly extending portion 27 which comprise approximately a quarter section of a thin walled cylinder, and a rear base portion 28 which has a threaded opening 29 located on the axis or center of the forwardly extending cylindrical portion. The abutment members 26 are located at opposite side corners of the housing. The base portion 28 of each abutment member threadably engages a machine screw 30 which is positioned longitudinally of the housing adjacent an inside corner thereof. The rear end of each machine screw 30 has a reduced diameter portion 31 which projects through a hole 32 in a respective one of a pair of inwardly turned leaves 33 of the housing. The rear end of each machine screw is riveted over behind its respective leaf 33 to prevent longitudinal movement of the machine screw relative to the housing. Openings 34 are provided in the corner portions of the housing 20 forwardly of respective leaves 33, and each opening 34 includes a forwardly extending portion 35 which is adapted to receive the forwardly extending cylindrical quarter sections 27 of the abutments 26 when in one position.

A normal installation of the housing into the panel is made by removing the fuse block 21 and light block 22 and rotating the cylindrical quarter sections 27 through the openings 35 to a position inside of the housing as shown in the lower left hand corner of FIG. 3. The entire housing may then be inserted in a panel opening only slightly larger than the height and width of the housing. Thereafter the abutments 26 are rotated clockwise to swing their cylindrical quarter sections 27 externally of the housing. Clockwise rotation of the machine screws 30 thereafter moves the abutment members 26 forwardly to engage the back surface of the panel at the sides of the opening and clamp the panel between the abutment members 26 and the front flange 24 of the housing.

In the clamping position of the abutments 26, the cylindrical quarter sections 27 are generally centered on a corner so that portions of the cylindrical quarter section overlie both of the side surfaces of the housing 20 which intersect to form the corner. Because the abutments 26 are located at opposite corners of the housing 20, a portion of one quarter section will engage the portion of the panel extending across the top of housing 20, while a portion of the other abutment 26 will engage the portion of the panel extending along the bottom of the housing. Similarly, a portion of the abutment 26 will engage a portion of a panel extending along the left side of the housing, while a portion of the other abutment 26 will engage a portion of the panel extending along the right side of the housing. It is therefore possible to lock a plurality of the housings 20 in either a side-by-side arrangement in a single long horizontal opening in a panel wherein the abutments 26 of each housing 20 engage the panel at the top and bottom of each housing; or it is possible to stack a plurality of the housings 20 in a long vertical panel opening wherein the abutments 26 of each housing 20 engage the panel at the opposite sides of each housing.

The rear end of the housing 20 receives a contact support structure shown most clearly in the right hand side of FIGS. 5, 6 and 7. The rear end wall of the structure comprises an inner rectangular wall section 36 made from an insulating material which fits into the housing 20 against a pair of tabs 37, only one of which is shown (see FIG. 7). The inner wall section 36 supports a pair of contact pins 38 which extend through tubular rivets 39 which in turn are riveted to the inner wall section. The contact pins 38 are biased forwardly by coil springs 40, and a pair of L-shaped terminals 41 are secured to the back side of the inner wall section 36 by the rivets 39 with the terminals 41 projecting rearwardly from the wall. (See FIG. 5.)

The inner wall section 36 is held in place by an outer wall section 42 which projects into the housing to abut the inner wall section 36 and which has a flange 43 adjacent its rear surface which abuts the rear of the housing. The rear wall section 42 is also made from an insulating material and is held in place by a pair of tabs 44, only one of which is shown, which is bent inwardly into pockets 45 in the side of the rear wall section. The rear wall section has recesses 46 (see FIG. 5) into which the contact pins 38 project, and also has slots 47 through which the terminals 41 project to a point rearwardly of the end wall.

An opening 48 (see FIG. 6) adapted to receive the end of a cartridge fuse 49 is provided through the inner rear wall 36, and the opening 48 communicates with a slightly larger recess 50 in the rear wall section 42. A coil spring 51 is positioned in the opening 48 and recess 50 with a single large diameter coil convolution 52 seated in the bottom of the recess 50. The coil spring 51 is held in place by a cylindrically shaped clip 53 which fits between the inner wall section 36 and the large diameter coil convolution 52. The clip 53 also has an L-shaped terminal section 54 which projects out through a slot 55 (see FIG. 10) in the rear wall section 42 to provide a third terminal connection externally of the housing. A fourth terminal 56 for the housing (see FIG. 11) is provided by a strip of conducting material having a center section which is bent upon itself and end portions which are bent outwardly in opposite directions from the center section to form a T-shaped clip. The oppositely bent portions of the clip are confined between the inner and outer wall sections 36 and 42 and the center section of the clip extends rearwardly through a slot 57 in the rear end wall to provide the fourth external terminal.

The fuse block 21 is a generally rectangularly shaped block which fits into the housing 20 and which has sections of its top right corner edge and its bottom left corner edge removed as at 60 in order to clear the machine screws 30. The fuse block has a stepped opening 61 (see FIG. 6) extending longitudinally therethrough, with its large diameter section 62 opening into the rear of the block and adapted to receive the front end of the fuse 49. An electrical connection is made between the front end of the fuse 49 and the terminal 56 of the housing by means of a split cylindrical insert 63 which fits into the section 62 of the opening and has an L-shaped connecting portion 64 which projects rearwardly into the T-shaped terminal 56. The insert 63 is held in place by a rear cover member 65 for the fuse block, which cover member has a pair of upper and lower channel sections 66 and 67 which face each other and which slide into recesses 68 and 69 respectively in the top and bottom surfaces of the block. The cover member 65 has a central opening 70 which aligns with the opening 62 and through which the fuse 49 extends.

The cartridge fuse 49 which is used in the embodiment of instrument is conventional, and shown in FIGS. 1–12. The fuse in its usual form comprises a tubular body 71 (see FIG. 6) made from an insulating material and having front and rear electrically conducting end caps 72 and 73 respectively. The front end cap 72 has a tubular sleeve 74 which projects inwardly and whose inner end 75 forms a shoulder around a central opening 76. A headed plunger 77 projects inwardly through the openings 76 and a coil spring 78 is positioned between the shoulder 75 and the head of the plunger 77 which is positioned forwardly of front end cap 72. The headed plunger 77 is normally held inwardly of the tubular body 71 by a fuse wire 79 which is fastened between the plunger 77 and the rear end cap 73. Upon melting of the fuse wire 79, the coil spring 78 biases the headed plunger 77 outwardly of the fuse body 71 to activate switch structure which will now be described.

The stepped opening 61 in which the fuse 49 is positioned has an intermediate diameter section 80 forming a shoulder 81 against which the front cap 72 of the fuse is normally positioned. The stepped opening 61 also includes a small diameter section 82 which communicates the intermediate diameter portion 80 with the front face of the fuse block 21. A headed button 83 made from an insulating material is positioned in the small diameter section 82 with its head portion 84 positioned in the intermediate diameter portion 80 of the stepped opening 61 to be abutted by the fuse plunger 77 when its fuse wire 79 is melted. The headed button 83 forms the actuating button for the switch structure S now being described, and since it is constructed of insulating material, the fuse and fuse plunger are completely insulated from the light circuit and from the remainder of the device at all times.

The movable contact of the switch structure is formed by a helical spring 90 (best seen in FIG. 8) which is formed by helically slotting a flat piece of electrically conducting phosphor bronze spring material 91 approximately .006 inch thick. The helical portion of the spring comprises two turns, the outer one of which is .037 inch wide and the inner one of which is .022 inch wide. The space between the turns is .015 inch wide. In the preferred embodiment, the thickness of the center portion of the helical spring 90 is reduced by from .001 to .002 of an inch to reduce its mass.

Most switch structures with which I am familiar have considerable mass and inertia so that the switches may become inadvertently actuated when they are subjected to extreme vibration unless they are rigidly restrained. The center of the helical spring 90 upon which the forces are applied has very little mass or inertia, and the distance from this mass to the stationary lateral portion 92 of the spring is kept to a minimum by wrapping the necessary length of spring in a spiral around the center portion. This arrangement therefore provides a structure whose moment of inertia is so small that the center contact portion of the spring does not move out of the plane of the spring to actuate the switch even under extreme vibration. In spite of this rigidity, the switch can be operated by a very light force.

The center portion of the helical spring 90 is positioned over the button 83, and the spring material 91 includes a lateral portion 92 which lays up against the front face of the fuse block 21 and a rearwardly extending contact leg 93 which extends through a passage 94. The rear of the leg 93 is bent over beneath an opening 95 in the rear cover 65 of the fuse block where it is contacted by the right hand contact pin 38. While it is not necessary in all instances, the helical spring 90 is positioned in a key shaped recess 96 in the front face of the fuse block to better protect the spring element.

The stationary contact of the switch S is formed by a pin 97 (see FIG. 6) which extends rearwardly of the lamp block 22 over the center of the helical spring 90. Upon melting of the fuse wire 79, the headed plunger 77 of the fuse projects forwardly to operate the button 83 which in turn forces the central portion of the helical spring 90 against the pin 97 to close the switch S.

The switch S, as can best be seen in the wiring diagram of FIG. 12, controls the lighting of two indicating lamps 98 in the light block 22. The light block 22 has an internal chamber 99 (see FIG. 6) which communicates with the rear of light block 22 by means of two openings 100. A U-shaped terminal 101 is fitted against the back of the light block 22 with its leg portions 102 projecting along the adjacent sidewalls of the openings 100. The U-shaped terminal is held in place against the back of the light block by means of a shoulder 103 on the pin 97 which is riveted to the light block. The lamps 98 have a base 104 which fits into the openings 100 against the legs 102 of the terminal 101, and are further provided with a flange 105 which bears against the rear of the terminal 101 to limit the extent to which the bulbs project forwardly into the chamber 99. The front of the chamber 99 is closed off by a color filter 106 which may contain lettering, and whose inside outer edge surface is recessed as at 107 to receive the front end of the sidewalls of the light block 22. The recess 107 provides a continuous shoulder 108 which engages the inside surface of the sidewalls of the light block 22 to prevent lateral and vertical movement of the filter 106 relative to the light block. The filter 106 is held in place by a cover member 109 having channel sections 110 on its two side surfaces which slide into grooves 111 in the outer side surfaces of the light block 22 to hold the cover member in place.

Alignment of the contact pin 97 with the center of the helical spring 90 is assured by means of hinge structure which connects the light block 22 to the fuse block 21. The hinge structure comprises four projections 112 (see FIGS. 2 and 8) which are spaced apart across the front of the fuse block 21, and three interfitting projections 113 which are spaced apart across the rear of the light block 22. The projections 112 and 113 dovetail with each other and have aligned openings in which a hinge pin 114 is received.

The sides of the base 104 of the lamps 98 which are in contact with the terminal 101 form one contact for the lamps, and the other contact for the lamps is formed by a center rounded projection or contact 115 in the center of the base of each lamp. A U-shaped spring 116 having a top cross piece 117 and two depending legs 118 is fastened to the front of the fuse block 21 by a pair of rivets 119 which extend through the top cross piece 117. The left rivet 119 extends into a longitudinally extending opening 120 (see FIG. 5) which opens into the rear of the fuse block and which is covered by the rear cover member 65. The left rivet 119 extends through and is riveted over a thin plate 121 in the front of the opening 120, and each of the legs 118 is aligned with and is abutted by a center contact of a respective one of the lamps. A circuit is established between the lamps and the left contact pin 38 by means of a spool shaped member 122 positioned in the opening 120 between the left rivet 119 and the left contact pin 38.

The unit is assembled by placing a fuse in the cylindrical clip 63 in the rear section 62 of the opening 61, and by inserting a pair of lamps into the rear of the opening 100. Thereafter the fuse block 21 and the light block 22 are inserted into the front of the housing 20 and are pressed rearwardly to cause: the cartridge 49 to compress spring 51; the L-shaped portion 64 of the fuse clip 63 to become wedged in the bent over section of the fourth terminal 56; the spool shaped member 120 to abut the left contact pin 38; and the rearwardly extending leg 93 of the bronze spring 91 to abut the right contact pin 38. Upon being inserted into the housing 20, the light block 22 is rotated parallel to the fuse block 21 to force the center contacts 115 of the lamps against the legs 118 of the spring 116. By holding an upwardly directed force on the front of the light block 22 at the time that inward pressure on the light block 22 is reduced, a pair of vertically extending detents 123 (see FIG. 5) are caused to ride outwardly and upwardly into holes 124 (see FIG. 7) in the housing 20 to lock the structure together. For convenience, the top left and top right terminals as seen facing the back of the unit (see FIG. 9) are labeled A and B respectively, and the lower left and right terminals are labeled C and D respectively. Upon assembly as above described, a fuse circuit is established from terminal C, through clip 53, fuse 49, clip 63, to the terminal D. The switch circuit is provided by terminal A (which is the right hand terminal 41), right hand pin 38, bronze spring strip 91, pin 97, U-shaped terminal 101, bulbs 98, center contacts 115, U-shaped spring 116, rivet 119, spool shaped member 122, left hand pin 38 and left hand terminal 41 which is terminal B. When an overload occurs in the circuit connected to the terminals C and D, the fuse wire 79 melts and plunger 77 is forced forwardly by spring 78. Forward movement of the plunger 77 moves headed button 83 forwardly to force the center portion of spring 90 against pin 97 to establish a light circuit between terminals A and B, so that illumination of the lamps occurs when the fuse is blown, and the operator can easily determine the source of trouble. Instruments according to the present invention are usually used in relatively large groups, to indicate the status of a number of circuits such as twenty or more.

In the embodiments so far described, the electrical supply for the lamps is separate from that of the fused circuit, and the illumination of the lamps indicates that the fuse 49 has blown as above described.

The embodiment shown diagrammatically in FIG. 13 is generally similar to that shown in FIG. 12 and previously described, but differs in that resistors 125 are inserted in series with the lamps 98 so that a higher voltage power supply can be applied to the terminals A and B than the voltage for which the bulbs 98 are rated.

The embodiment shown in FIG. 14 is generally similar to that shown in FIG. 15 excepting that the embodiment of FIG. 15 has resistors 130 in series with the lamps 98. The embodiments shown in FIGS. 14 and 15 both use a plain cartridge fuse 131 and connect the lamp terminal A to the fuse terminal C, and the lamp terminal B to the fuse terminal D so that the lamp circuit is normally short circuited by the fuse circuit. When the fuse 131 in either of the systems shown in FIGS. 14 and 15 blows, the voltage drop between the terminals C and D increases and the lights 98 become illuminated to indicate that the fuse has blown.

FIG. 16 of the drawings shows the manner in which the previously described embodiment of instrument can be altered in conformity with the wiring diagram of FIG. 15. Those portions of FIG. 16 which correspond to portions of the embodiment shown in FIGS. 1–12 are designated by a like reference numeral characterized further in that a prime mark is affixed thereto.

The fuse 131 is a plain cartridge fuse and does not have a switch operating plunger. The front end of fuse 131 abuts a coil spring 132 which holds the button 83 forwardly and in turn holds the spring 90' against the contact pin 97'. In the embodiment of FIG. 16, the left and right spring legs 118' are not joined by a connecting top piece, but are respectively connected by wires 133 and 134 to left and right resistors 130. The resistors 130 are positioned in the chamber 120' and the rear of the left and right resistors 130 are connected by wires 135 and 136 to a button 137. The button 137 is abutted by the left hand contact pin 38' to complete the circuit to the terminal B. As previously indicated, terminals B and D are tied together, as are terminals A and C, so that when fuse 131 blows the full voltage of the electrical supply to terminals D and C is applied across the lamps 98 and resistors 130. Resistors 130 are so sized as to limit the voltage drop across the lamps 98 to that for which the lamps 98 were designed. In the embodiments shown diagrammatically in FIGS. 14 and 15, the element 90' is not used as a switch but is kept closed by the coil spring 132 until the assembly is taken out of the housing.

When it is desired to replace a fuse in any of the embodiments of instruments described, the lamp block 22 is pressed inwardly and downwardly to pull the detents 123 out of the openings 124. Upon releasing pressure on the lamp block 22, the lamp block 22 is moved outwardly by the spring 52 to a point where it can be grasped by the thumb and forefinger and pulled from the housing. Because the fuse block 21 is hinged to the lamp block 22, the two are removed together. Once out of the housing, the inoperative fuse can be pulled out of its clip 63 and a new one installed. By allowing the light block 22 to swing away from the fuse block 21 access can be had to the rear of the lamps 98, and either one or both of the lamps can be pulled out and replaced.

It will be apparent that the object heretofore enumerated as well as others have been accomplished and that there has been provided an instrument having: new and improved means for mounting on a panel, a new and improved electrical switch, and a new and improved arrangement for housing a fuse and indicating lights so that they can be quickly assembled together and secured in a housing.

While the invention has been described in detail, I do not wish to be limited to the particular embodiments shown and described, and it is my intention to cover hereby all novel adaptations, modifications and arrangements thereof which come within the scope of the appended claims.

What I claim is:

1. In an electrical lamp assembly, a hollow light block having an end surface which surrounds an internal lamp receiving opening, said light block having a pair of external opposite side surfaces which are generally parallel and which contain parallel grooves therein, a filter section overlying the end surface of said light block, said filter section having shoulder portions which abut the sidewalls of said internal opening and prevent relative movement therebetween, and a lens cover section overlying said filter section, said lens cover section having one side which does not appreciably overlie side surfaces of said filter section and light block, an opposite side surface which overlies the opposite side of said lens cover section and light block, and a pair of connecting sides which are provided with channel sections which project into said parallel grooves in the external surface of said light block to lock said filter section and lens cover section in place.

2. In an electrical lamp assembly, a hollow light block having an end surface which surrounds an internal lamp receiving opening, said light block having a pair of external opposite side surfaces which are generally parallel and which contain parallel grooves therein, a filter section adapted to overlie the end surface of said light block, said filter section having shoulder portions which abut the sidewalls of said internal opening and prevent relative movement therebetween, a lens cover section overlying said filter section, said lens cover section having one side which does not appreciably overlie side surfaces of said filter section and light block, an opposite side surface which overlies the opposite side of said lens cover section and light block, and a pair of connecting sides which are provided with channel sections which project into said parallel grooves in the external surface of said light block to lock said filter section and lens cover section in place, a housing having an opening adapted to receive said light block with said lens cover in place, means on said light block for locking said light block into said opening of said housing, and said housing having a portion which overlies at least a portion of said opposite side surface of said lens cover section to prevent removal of said lens cover section when said lens cover and light block are locked in said housing.

3. An electrical device comprising and elongated housing forming an internal chamber with an opening at one end, a component-receiving block in said internal chamber when the device is in an operative condition, a light housing block in said internal chamber in front of said component-receiving block toward said opening when the device is in an operative condition, said component-receiving block having an outer surface facing said light housing block, said light housing block having an inner surface facing said component-receiving block, a lamp having a base terminal projecting from said inner face of said light housing block toward said component-receiving block, spring contact means affixed to said component-receiving block and positioned between said blocks, said spring contact means abutting said base terminal of said lamp and biasing said blocks apart when said surfaces are in adjacent relationship, said surfaces being adjacent one another when said blocks are in said chamber, said component-receiving block having electrical contact means thereon and said housing having electrical contact means, said electrical contact means being in electrical contact when said blocks are in said chamber and said device is in the operative condition, hinge means connecting said blocks, and means holding said blocks in position in said chamber.

4. The combination of elements defined in claim 3 in which said component receiving block has a central longitudinal chamber, a fuse member in said chamber of the type in which a plunger is extended upon destruction of a fuse wire, a shell terminal for said lamp, and switch means actuated by said fuse plunger to complete an electric circuit to said shell terminal and through said lamp upon extension of said plunger to light said lamp and thereby indicate the destroyed condition of said fuse.

5. The combination of elements defined in claim 4 in which said switch means includes a movable contact member in the form of a spiral spring having all of its convolutions normally disposed in a common plane and having a center contact area lying in the path of movement of said plunger.

6. The electrical device of claim 3 wherein said light housing block has an abutment facing toward said component-receiving block against which abutment said lamp is held by said spring contact means when said surfaces are adjacent one another, whereby said device can be relamped by rotating said light housing block about said hinge means away from said component-receiving block to enable the old lamp to be withdrawn from the back of said light housing block and a new lamp placed in said light housing block against said abutment.

7. An electrical device comprising an elongated housing forming an internal chamber with an opening at one end, a component-receiving block in said internal chamber when the device is in an operative condition, a light housing block in said internal chamber in front of said component-receiving block toward said opening when the device is in an operative condition, said component-receiving block having an outer surface facing said light housing block, said light housing block having an inner surface facing said component-receiving block, a lamp having a base terminal projecting from said inner face of said light housing block toward said component-receiving block, spring contact means affixed to said component-receiving block and positioned between said blocks, said spring contact means abutting said base terminal of said lamp and biasing said blocks apart when said surfaces are in adjacent relationship, said surfaces being adjacent one another when said blocks are in said chamber, said component-receiving block having electrical contact means thereon and said housing having electrical contact means, said electrical contact means being in electrical contact when said blocks are in said chamber and said device is in the operative condition, hinge means connecting the outer surface of said component-receiving block and the inner surface of said light housing block adjacent one side edge of said blocks, resilient means urging said blocks out of said chamber through said opening, when said blocks are in said chamber and said device is operative, and means holding said blocks in position in said chamber.

8. The electrical device of claim 7 wherein said light housing block has detent projections which extend outwardly and upwardly and said housing has openings in its upper surface into which said detent projections extend to lock said blocks in said housing.

References Cited by the Examiner

UNITED STATES PATENTS

| | | | |
|---|---|---|---|
| 2,496,759 | 2/1950 | Warsher | 200—121 |
| 2,598,613 | 4/1952 | Simoni | 200—153 |
| 2,652,466 | 9/1953 | Mohring | 200—121 |
| 2,777,918 | 1/1957 | Sears | 200—118 |
| 2,923,796 | 2/1960 | Davis | 200—118 |
| 2,931,878 | 4/1960 | Eisenberg | 200—168 |
| 3,030,480 | 4/1962 | Callender | 200—168 |
| 3,038,981 | 6/1962 | Larkin | 200—153 |
| 3,157,771 | 11/1964 | Roeser | 200—167 |
| 3,163,740 | 12/1964 | Ross | 200—167 |
| 3,188,437 | 6/1965 | Lauren et al. | 200—167 |
| 3,197,598 | 7/1965 | Andersen et al. | 200—167 |

ROBERT K. SCHAEFER, *Primary Examiner.*

KATHLEEN H. CLAFFY, *Examiner.*

H. O. JONES, *Assistant Examiner.*